(12) United States Patent
Smith et al.

(10) Patent No.: US 6,413,488 B1
(45) Date of Patent: *Jul. 2, 2002

(54) POST CONVERSION OF A GAS CONTAINING HYDROGEN SULPHIDE, THE ELIMINATION OF SULPHUR CRYSTALLIZED BY COOLING

(75) Inventors: David Smith, Vernouillet; David Benayoun, Sartrouville; Claude Dezael, Maisons Laffitte, all of (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/355,067

(22) PCT Filed: Jun. 12, 1996

(86) PCT No.: PCT/FR96/00889

§ 371 (c)(1),
(2), (4) Date: Jun. 19, 2000

(87) PCT Pub. No.: WO97/00226

PCT Pub. Date: Jan. 3, 1997

(30) Foreign Application Priority Data

Jun. 15, 1995 (FR) .............................. 95/07381

(51) Int. Cl.[7] .................. B01D 53/50; B01D 53/52; B01J 19/00; C01B 17/05
(52) U.S. Cl. .................. 423/574.1; 423/575; 423/576.2; 422/168; 422/169; 422/177; 422/181; 422/234; 422/235
(58) Field of Search .................. 423/574.1, 575, 423/576.2; 422/168, 169, 234, 235, 177, 181

(56) References Cited

U.S. PATENT DOCUMENTS

| | | | | |
|---|---|---|---|---|
| 3,862,335 A | * | 1/1975 | Renault et al. | 423/575 |
| 4,387,037 A | * | 6/1983 | Trentham et al. | 252/184 |
| 5,935,547 A | * | 8/1999 | LeComte et al. | 423/575 |
| 5,951,961 A | * | 9/1999 | Viltard et al. | 423/575 |
| 6,210,454 B1 | * | 4/2001 | Viltard et al. | 48/127.9 |

FOREIGN PATENT DOCUMENTS

| | | |
|---|---|---|
| EP | 102894 A1 | 3/1984 |
| FR | 2336163 | 7/1977 |
| FR | 2338738 | 8/1977 |
| FR | 2358186 | 2/1978 |
| FR | 2411802 | 7/1979 |
| FR | 2532190 | 3/1984 |

* cited by examiner

Primary Examiner—Steven P. Griffin
Assistant Examiner—Timothy C Vanoy
(74) Attorney, Agent, or Firm—Millen, White, Zelano & Branigan, P.C.

(57) ABSTRACT

A process and an apparatus are described for treatment of a gas containing hydrogen sulphide and sulphur dioxide, for example a Claus plant tail gas, in which the gas is brought into contact with an organic solvent (1) e.g. polyethylene glycol 400, containing a catalyst e.g. sodium salicylate, in at least one gas-liquid reactor-contactor (2) and a gas (20) substantially no longer containing hydrogen sulphide and sulphur dioxide is recovered. A single-phase solution (4) of solvent and sulphur is extracted from the reactor-contactor and a portion is cooled in at least one cooling zone (8) to obtain a suspension of sulphur crystals in the solvent, the crystallised sulphur is separated from the solvent in a separation zone (10), the sulphur-depleted solvent (14, 15) is recovered and recycled at least in part to the reactor-contactor (2), and the sulphur (13) is recovered.

20 Claims, 2 Drawing Sheets

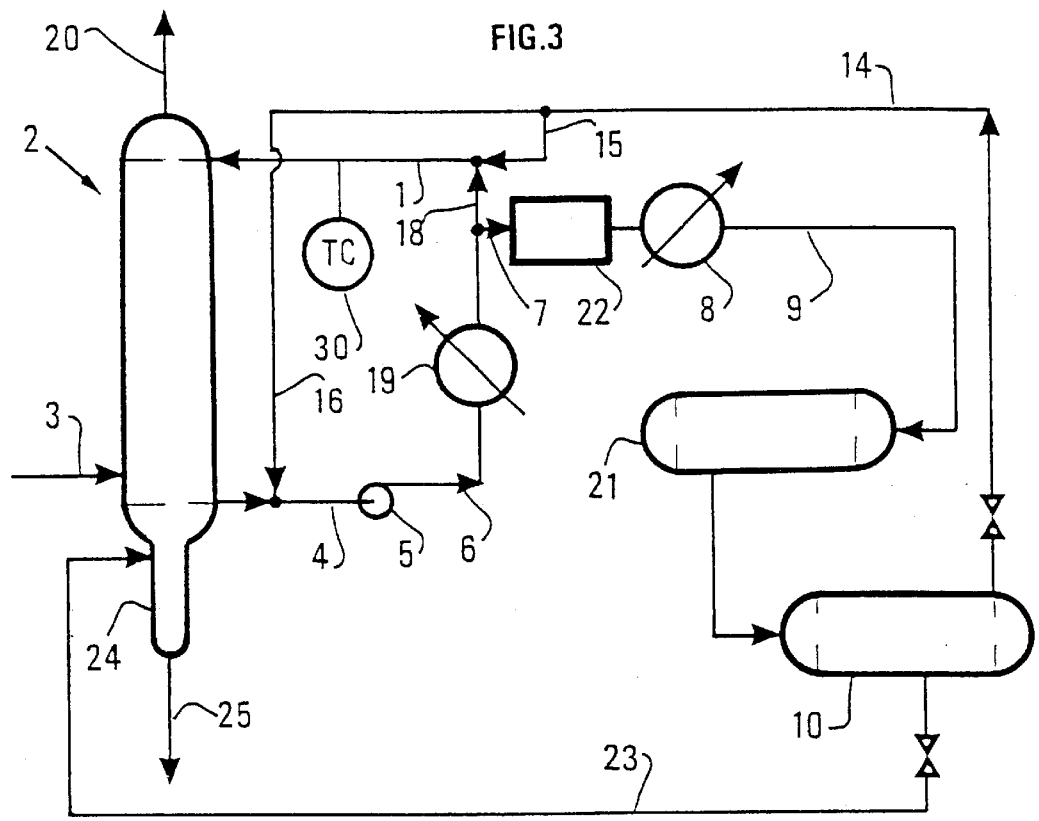
FIG.3
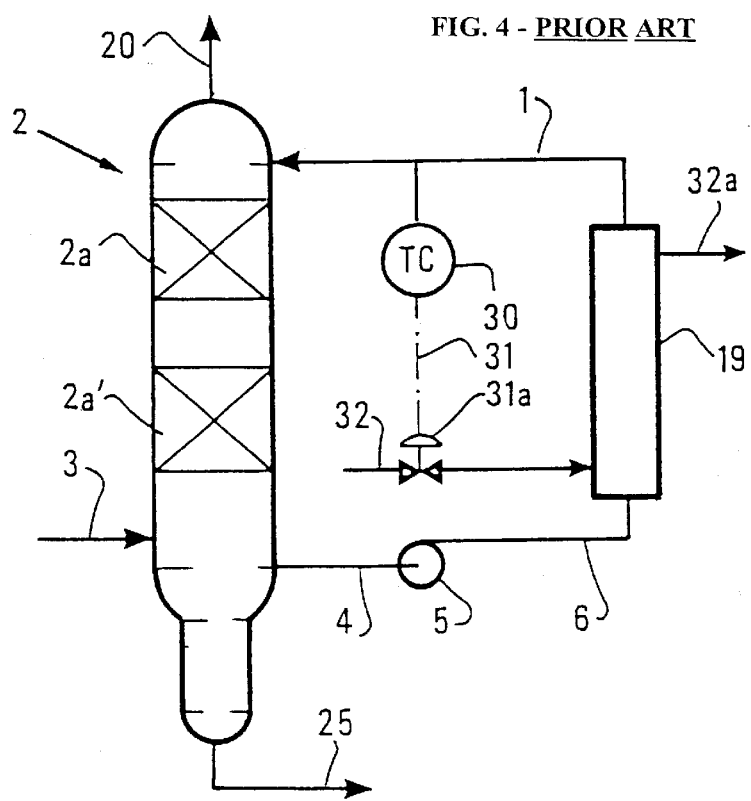
FIG. 4 - PRIOR ART

POST CONVERSION OF A GAS CONTAINING HYDROGEN SULPHIDE, THE ELIMINATION OF SULPHUR CRYSTALLIZED BY COOLING

An object of the present invention is to provide a process for the treatment of tail gas from a Claus unit or a gas containing essentially hydrogen sulphide and sulphur dioxide as sulphur-containing compounds.

It particularly concerns the treatment of Claus plant tail gas, in particular from hydrodesulphurization and catalytic cracking units. It also concerns the final purification treatment of natural gas. The prior art is illustrated in the following patents: European patent EP-A-0 102 894, French patents FR-A-2 411 802, FR-A-2 532 190, FR-A-2 338 738 and more particularly, French patents FR-A-2 336 163 and FR-A-2 358 186.

French patent FR-A-2 336 163 describes a process for the elimination of sulphur from a charge containing hydrocarbons and hydrogen sulphide by reacting the charge with sulphur dioxide produced ex-situ.

French patent FR-A-2 358 186 describes a process for the elimination of sulphur from a charge containing hydrocarbons and hydrogen sulphide by reacting the charge with $SO_2$ and excess $H_2S$, which are separately introduced. The purified gas containing $H_2S$ is treated with amines and $H_2S$ is recycled to the inlet of the charge into the absorber.

These processes require separate introduction of sulphur dioxide.

Further, the quantities of solid sulphur to be separated from the solvent are far higher (about 1.5 times greater). This process thus requires the sulphur to be recycled to produce the $SO_2$ required for the reaction, thus requiring bigger apparatus.

The Claus process is widely used to recover elemental sulphur from gaseous charges containing hydrogen sulphide ($H_2S$). However, the fumes emitted by Claus type plants, even after a number of catalytic stages, contain non negligible quantities of acid gas. This Claus plant tail gas must therefore be treated to eliminate the majority of toxic compounds in order to comply with anti-pollution regulations. These regulations are becoming ever more strict and thus existing technology must constantly be improved.

As an example, about 95% by weight of the sulphur present can be recovered from a Claus plant; treatment of this Claus plant tail gas (by means of a Clauspol plant, for example) can, for example, recover up to 99.8% by weight of the sulphur by using the following reaction:

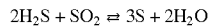

$$2H_2S + SO_2 \rightleftharpoons 3S + 2H_2O$$

using a reaction medium constituted by an organic solvent and a catalyst comprising an alkaline or alkaline-earth salt and an organic acid. The reaction is carried out in a counter-current reactor-contactor and the temperature is controlled by passing the solvent extracted from the lower extremity of the reactor through a heat exchanger via a circulating pump, in order to obtain higher conversion to sulphur while avoiding the formation of solid sulphur. The sulphur is then recovered in liquid form. While the process performance is high, it is limited by different constraints:

the thermodynamic equilibrium of the reaction is such that the reaction never goes to e completion. Some hydrogen sulphide and sulphur dioxide remain in equilibrium with the sulphur and water formed. Typically, the quantity of sulphur present in the unreacted $H_2S$ and $SO_2$ and found in the reaction effluent (Clauspol) corresponds to about 0.05% of the total sulphur in the initial charge to the Claus plant. Better conversion could be achieved at a lower operating temperature but this temperature must be kept above the freezing point of sulphur (about 120° C.), otherwise the reactor would be blocked by solid sulphur;

the presence of unseparated liquid sulphur in the reactor-contactor, entrained in the solvent and the catalyst which is circulating and which is recycled to the reactor contactor. Not all the droplets of liquid sulphur are separated from the solvent and the presence of liquid sulphur unavoidably entails the presence of gaseous sulphur in the effluent due to the vapour tension of sulphur. As an example, the quantity of non recovered sulphur attributable to its vapour tension is about 0.1% by weight of the sulphur in the initial charge.

The invention aims to overcome the drawbacks of the prior art.

A further object of the invention is to satisfy the strictest standards demanded in the fight against atmospheric pollution by sulphur-containing compounds.

A still further object is to be able to modify existing installations provided with a Claus plant and a unit for treating the effluents from that plant (Clauspol plant) at very low cost.

We have shown that by eliminating substantially all the sulphur vapour in the effluents from a gas treatment plant, for example effluents from Clauspol plants, up to 99.9% of the total sulphur can be recovered and thus the quantity of sulphur emitted into the atmosphere during incineration of the gas can be minimised.

More precisely, the invention concerns a process for the treatment of a non hydrocarbon-containing gas containing sulphur-containing gases, the majority being hydrogen sulphide and sulphur dioxide, in which the gas is brought into contact with an organic solvent containing a catalyst in at least one gas-liquid reactor-contactor at a suitable temperature and a gaseous effluent substantially no longer containing hydrogen sulphide and sulphur dioxide is recovered, characterized in that a single-phase solution of solvent and sulphur is extracted from the reactor-contactor and a portion is cooled in at least one cooling zone to obtain a suspension of sulphur crystals in the solvent, the crystallised sulphur being separated from the solvent in a separation zone, the sulphur-depleted solvent being recovered and recycled at least in part to the reactor-contactor, and the sulphur being recovered.

The term "non hydrocarbon-containing gas" means a charge containing at most 1% by volume of hydrocarbons, preferably at most 500 ppm of hydrocarbons.

Advantageously, the effluent and solvent containing the catalyst are brought into contact as a counter-current.

Cooling the single-phase solution containing the organic solvent significantly reduces the sulphur content and after separation of the crystallised sulphur, the sulphur-depleted organic solvent can be recycled to the reactor-contactor.

In a further feature of the invention, the sulphur separated from the solvent which is recovered in a minimum quantity of solvent can be settled and melted. It can thus be extracted in liquid form. The solvent phase which is recovered can be at least partially recycled upstream of the cooling zone.

In a further advantageous feature of the invention, the remaining portion of the single-phase solution extracted from the reactor-contactor which is not introduced into the cooling zone can be recycled to the reactor-contactor either after mixing with the sulphur-depleted solvent or separately at a point in the reactor-contactor which is below the point for the introduction of the sulphur-depleted solvent. Only about 3% to 50%, advantageously 5% to 20% and preferably 8% to 15% by weight of the single-phase solution needs to be cooled. These conditions mean that a heat exchanger located in the line for recycling the remaining portion of the single-phase solution to the reactor-contactor can be eliminated. As an example, if about 50% of the solution is cooled, this heat exchange is no longer necessary.

Further, by only desaturating a minor portion of the solution of sulphur, the size and thus cost, of the downstream equipment (exchanger, separator) is reduced.

However, the remaining portion of the single-phase solution can be cooled in a further heat exchanger before recycling it to eliminate at least a portion of the heat of reaction liberated in the reactor. This exchanger is generally placed between the outlet for the single-phase solution from the reactor-contactor and the inlet into the reactor-contactor for the sulphur-depleted recycled solvent. In other words, the heat exchanger can partially contribute to cooling either all of the single-phase solution or the remaining portion of the single-phase solution which is not subjected to principal cooling to eliminate sulphur vapour.

In a further feature, the remaining portion of the sulphur-depleted solvent can be recycled upstream of the cooling zone.

In a still further feature of the invention, the size of the crystals in the suspension of sulphur resulting from the cooling step can be increased in at least one crystallisation reservoir interposed between the cooling zone and the separation zone. They can be left there for a suitable period of time before separation. This favours separation and high efficiency cyclones do not need to be used.

The process of the invention and the means for carrying it out can be adapted to a conventional process and apparatus for the treatment of Claus plant tail gases.

Thus the reactor-contactor generally comprises a heat exchanger or equivalent heating means in its lower portion, more precisely in its settling zone. At least a portion of the sulphur separated from the solvent during the separation step can be introduced and liquid sulphur can be extracted from the settling zone of the reactor-contactor. Existing plant can thus be remodelled.

Since the solvent in the reactor-contactor is below the saturation threshold for sulphur, sulphur no longer deposits in the reactor-contactor packing as it remains in solution.

On the other hand, salts from the catalyst, generally alkali metal sulphates, are produced in the reactor-contactor and a suspension thereof circulates in the circuit. Since there is no longer any risk of blockage by sulphur, these salts can be separated using, for example, suitable filters or a column containing a suitable packing, before cooling the single-phase solution of solvent and sulphur.

The reactor-contactor can be operated at a temperature at which the solvent remains liquid, advantageously 50° C. to 130° C., preferably 80° C. to 125° C.

The cooling temperature for the single-phase solution extracted from the reactor-contactor can be down to a temperature close to the freezing point of the solvent, advantageously at a temperature in the range 20° C. to 100° C., selected as a function of the temperature of the reactor-contactor. This temperature is reached after passage through at least one conventional heat exchanger, or after the injection of water.

The solvents which are. generally used are mono- or polyalkylene glycols, mono- or polyalkylene glycol esters or mono- or polyalkylene glycol ethers such as those described in FR-A-2 115 721 (U.S. Pat. No. 3,796,796), FR-A-2 122 674 and FR-A-2 138 371 (U.S. Pat. No. 3,832,454), hereby incorporated by reference. The catalysts are normally those described in these patents, more particularly the alkaline salts of weak organic acids such as benzoic acid and salicylic acid.

The invention also concerns an apparatus for carrying out the process. More precisely, the apparatus comprises at least one gas-liquid reactor-contactor containing at least one packing, at least one gas supply (3) connected to the reactor-contactor, at least one supply (1) for a solvent containing a catalyst connected to the reactor-contactor, means for evacuating purified gas connected to the reactor-contactor, means for extracting a portion of the single-phase solution connected to the reactor-contactor, means (8) for cooling a solution connected to said extraction means, means (10) for separating sulphur from the solvent containing the catalyst connected to the cooling means (8), means (14) for recycling solvent connected to the separation means (10) and to the solvent supply (1), and means (13) for extracting separated sulphur connected to the separation means. Further, a line (18) for recycling the remaining portion of the single-phase solution is connected to the reactor-contactor.

The invention will be better understood from the following figures which show schematic views of a number of embodiments:

FIGS. 2 and 3 show variations of apparatus which can be used with existing plants in which the separated sulphur is returned to the gas-liquid reactor-contactor as a suspension or as a liquid; and FIG. 4 shows the prior art.

Figure 1:
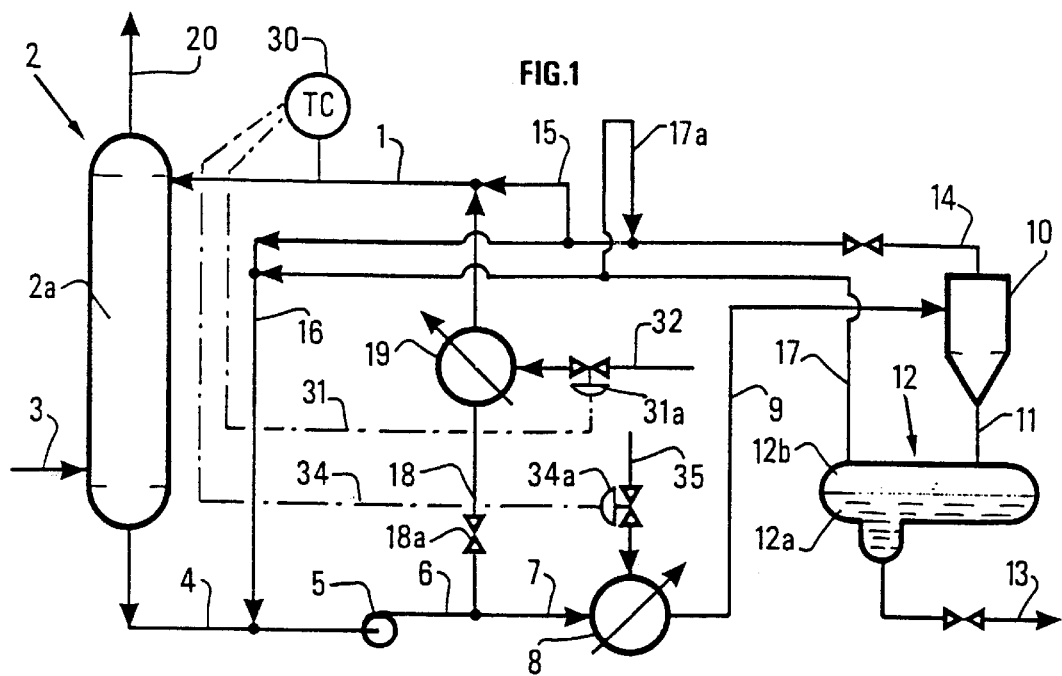
FIG. 1 shows an apparatus for the treatment of sulphur-containing gas, particularly comprising a cooling zone for the single-phase solution containing sulphur followed by a sulphur separation zone.

The apparatus of FIG. 1 comprises a gas-liquid reactor-contactor 2 which preferably operates in counter-current mode, for example at a temperature of 120° C., containing a packing 2a of ceramic material (for example INTALOX™ saddle packing, or Raschig rings).

Line 3 laterally supplies a sulphur-containing charge, for example a Claus plant tail gas, to the lower part of the reactor-contactor beneath the packing, while a line 1 laterally introduces a recycled solvent solution, for example polyethylene glycol 400 and a catalyst, for example sodium salicylate, to its upper portion, above the packing.

The purified gas containing generally less than 10 ppm of sulphur is evacuated from the upper portion of the reactor-contactor via line 20.

A single-phase solvent solution containing catalyst and sulphur is extracted from the lower extremity of reactor-contactor 2 via a line 4 and sent in part, for example 15%, via pump 5 and lines 6 and 7, to a heat exchanger 8 where it is cooled to a temperature of 60° C., for example. A suspension of sulphur crystals is recovered via line 9 and sent to a separation hydrocyclone. The sulphur recovered in a minimal quantity of solvent at the bottom of the cyclone is transferred via conduit 11 and is settled in a chamber 12. The lower layer 12a, which is rich in sulphur, is melted there using suitable melting means, for example a jet of steam, and recovered in liquid form via line 13 connected to the kettle.

The sulphur-depleted solvent contained in the upper layer 12b is recycled from the settling chamber 12 upstream of pump 5 via a line 17 and/or via a line 17a and line 1 to reactor-contactor 2.

The solvent containing the catalyst is recovered overhead of the cyclone and recycled to the top of the reactor-contactor via lines 14, 15 and 1 and optionally partially recycled upstream of the pump via lines 14 and 16.

Preferably, 15% to 20% of the single-phase solvent solution is depleted in sulphur; the remaining solution is sent via pump 5, control valve 18a and line 18, optionally to a second heat exchanger 19 where it is cooled to a suitable temperature compatible with the operation of the reactor-contactor. This temperature is controlled by control unit 30 connected to exchangers 19 and 8 via lines 31 and 34. These are respectively connected to valves 31a and 34a located in cooling fluid lines 32 and 35. The mixture from lines 18 and 15 is recycled via line 1 to the top of reactor-contactor 2.

Figure 2:
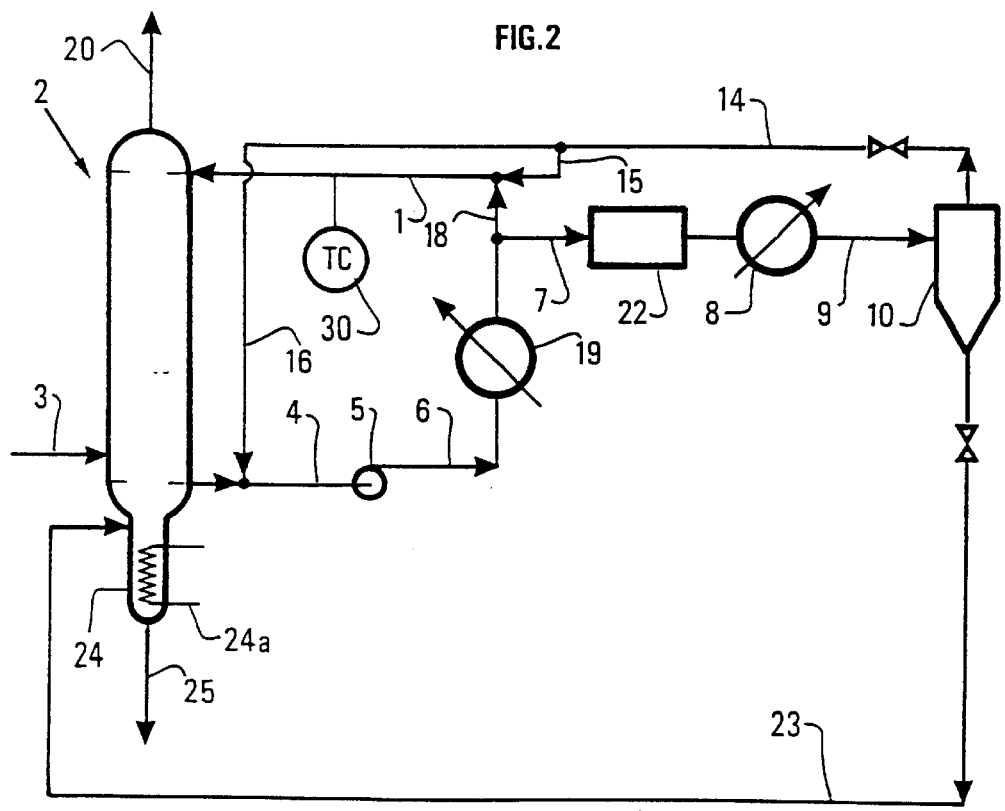

In a variation shown in FIG. 2, which uses the same reference numerals for the same means as those in FIG. 1 and intended to remodel an existing Claus plant tail gas treatment plant, reactor-contactor 2 generally comprises in its lower portion a settling means 24 which can be heated by suitable heating means 24a. Line 9 at the outlet to heat exchanger 8 sends the suspension of sulphur crystals to hydrocyclone 10. A concentrated sulphur suspension is recovered from its lower portion and sent via a line 23 to settling means 24 of the reactor-contactor where the sulphur is melted. It is then extracted via line 25 in liquid form.

A portion of the single-phase solution of solvent and sulphur leaving the reactor-contactor can be freed of at least a portion of the sodium sulphate which circulates in the cooling and separation circuit by interposing a filter 22 in line 7 upstream of heat exchanger 8. On the other hand, in contrast to that shown in FIG. 1, the temperature of all the single-phase solution of solvent and sulphur can be controlled by heat exchanger 19 so that the thermal balance is not excessive, before being partially diverted via line 7 to filter 22 and heat exchanger 8, the remainder of the partially cooled solution being recycled via line 18 to the reactor-contactor.

FIG. 3 shows a further variation which has the same configuration as that of FIG. 2 except that the suspension of sulphur crystals resulting from cooling in heat exchanger 8 is sent via a line 9 to a crystallisation reservoir 21. The suspension of sulphur crystals remains there for a period of time during which the crystal size increases to 10 to 100 micrometers.

Subsequent separation is then easier and a separator-kettle 10 can replace the cyclone of FIG. 1 or FIG. 2. The liquid sulphur recovered from the bottom of the separator is introduced via line 23 into settling means 24 from which it is extracted via line 25.

The invention will be better understood from the following examples:

EXAMPLE 1

Comparative, FIG. 4

A Claus plant tail gas with a volume ratio of substantially 2:1 and a flow rate of 12300 Nm³/h was introduced via a line 3 into a reactor-contactor constituted by a column 2 containing two beds of packing 2a and 2a' and brought into contact at 125° C. with an organic solvent containing a soluble catalyst introduced via a line 1.

The packing used in this example was constituted by two beds of (INTALOX™) ceramic saddle packing with a specific surface area of 250 m²/m³ and capable of retaining small quantities of sodium salts formed during the reaction.

The organic solvent was a polyethylene glycol with a molecular mass of 400 and the soluble catalyst was sodium salicylate with a concentration of 100 millimoles/kg of isolvent.

The solvent was recycled between the bottom and top of the reactor via lines 4 and 1 at a flow rate of 500 m³/h using a circulating pump 5, through a heat exchanger 19 whose temperature was controlled and regulated by a measurement and control system 30 and 31a which could inject hot water at 80° C. into the exchanger via line 32 and evacuate it via line 32a. The temperature of the recycled solvent was 123° C.

The purified gas left the reactor via line 20. The sulphur formed settled out in the bottom of the reactor and was extracted via line 25 at a rate of 332 kg/h.

The compositions of the inlet and outlet gases of the plant are shown in the following table:

|  | Inlet gas (3) vol % | Outlet gas (20) vol % |
|---|---|---|
| $H_2S$ | 1.234 | 0.0586 |
| $SO_2$ | 0.617 | 0.0293 |
| $CO_2$ | 4 | 4.038 |
| COS | 0.015 | 0.009 |
| $CS_2$ | 0.015 | 0.009 |
| $S_v$* | 0.14 | 0.03 |
| $N_2$ | 60 | 60.396 |
| $H_2O$ | 34 | 35.384 |
| Sum of sulphur-containing compounds (counted as sulphur) | 2.036 | 0.1449 |

*$S_v$ = sulphur vapour + vesicular sulphur

The yield of sulphur-containing compounds in the reactor is equal to:

$$\frac{\% \text{ of sulphur-containing compounds at inlet} - \% \text{ of sulphur-containing compounds at outlet}}{\% \text{ of sulphur-containing compounds at inlet}} \times 100 =$$

$$\left(\frac{2.036 - 0.1449}{2.036}\right) \times 100 = 92.88\%$$

The yield of the Claus plant assembly with 97% yield+a finishing plant of the prior art was:

$$97 + \left(\frac{3 \times 92.88}{100}\right) = 99.78\%$$

EXAMPLE 2

The reactor of Example 1 was used, containing 2 beds of ceramic INTALOX™ saddle packing to effect contact between the Claus plant tail gas and the same solvent containing the same soluble catalyst.

The Claus plant tail gas was introduced into the reactor via line 3 at the same flow rate (12300 Nm³/h) and the solvent containing the catalyst was introduced via line 5 at a rate of 500 m³/h using pump 5, the temperature of the solvent being held at 100° C. by exchanger 19 supplied with hot water via line 32.

The major difference from the preceding example, forming the subject matter of the invention, consisted of extracting a single-phase solution containing solvent and sulphur via line 7 at a rate of 25 m³/h. This portion of the solvent was cooled to 60° C. by exchanger 8, to precipitate the sulphur in crystallised form and which was separated from the solvent by hydrocyclone 10 and settler 12. The settler thus formed a layer 12a formed of solvent which was very rich in crystallised sulphur (about 50% by weight of sulphur) and a layer 12b constituted by solvent which was depleted in soluble sulphur, the solvent being returned to the main circulating circuit via lines 17, 17a, 1. The solvent from hydrocyclone 10 was reintroduced to the main circulation circuit 1 via line 14.

The remaining portion (18) was recycled to the reactor-contactor.

Every eight hours, the base of separator 12a was heated to 125° C. using a jet of steam to melt the sulphur which was then extracted via line 13 at a rate of 2765 kg per 8 hour period. After extraction of the sulphur, the settler was brought to its normal operating temperature (about 80° C.).

The compositions of the inlet and outlet gases for the plant are shown in the following table:

|  | Inlet gas (3) vol % | Outlet gas (20) vol % |
|---|---|---|
| $H_2S$ | 1.234 | 0.0247 |
| $SO_2$ | 0.617 | 0.0123 |
| $CO_2$ | 4 | 4.038 |
| COS | 0.015 | 0.009 |
| $CS_2$ | 0.015 | 0.009 |
| $S_v$ | 0.14 | 0.003 |
| $N_2$ | 60 | 60.396 |
| $H_2O$ | 34 | 35.520 |
| Sum of sulphur-containing compounds | 2.036 | 0.067 |

The yield of sulphur-containing compounds in the reactor was equal to:

$$\left(\frac{2.036 - 0.067}{2.036}\right) \times 100 = 96.7\%$$

The yield of the Claus plant with 97% yield+finishing unit was equal to:

$$97=2.90=99.9\%$$

It should be noted that the $H_2S$ and $SO_2$ yields at the reactor outlet were substantially reduced and that the amount of sulphur vapour was also substantially reduced.

EXAMPLE 3

Reactor 2 of FIG. 2 containing two beds of metal packing with an interface area of 500 $m^2/m^3$ was used to effect contact between the Claus plant tail gas and the solvent and catalyst of Example 1.

The Claus plant tail gas was introduced at a rate of 12300 $Nm^3/h$ via line 3 and the solvent containing the catalyst was introduced via line 1 at a rate of 500 $m^3/h$, the temperature of the solvent being held at 125° C. by exchanger 19, supplied with hot water via line 32 and evacuated via line 32a. Purified gas left via line 20.

A portion of the single-phase solution containing solvent and sulphur was removed via line 7 at a rate of 50 $m^3/h$ and sent to reactor 22 containing a ceramic packing (INTALOX™ saddle packing with a specific surface area of 250 $m^2/m^3$), to deposit sodium salts, mainly sodium sulphate. The solution was then sent to exchanger 8 cooled to 80° C. by means of hot water. The solvent—solid sulphur mixture produced by cooling was sent to a separator system 10 (hydrocyclone), and the sulphur-depleted solvent was returned via lines 14 and 16 to the main recirculation circuit and returned to reactor 2 via lines 18 and 1, line 18 also recovering the remaining portion of the single-phase solution. The solvent, concentrated in solid sulphur, was returned via line 23 to the base of reactor 2 where it was melted by means of steam coils 24a and extracted via line 25 at a rate of 341 kg/h.

|  | Inlet gas (3) vol % | Outlet gas (20) vol % |
|---|---|---|
| $H_2S$ | 1.234 | 0.040 |
| $SO_2$ | 0.617 | 0.020 |
| $CO_2$ | 4 | 4.038 |
| COS | 0.015 | 0.009 |
| $CS_2$ | 0.015 | 0.009 |
| $S_v$* | 0.14 | 0.006 |
| $N_2$ | 60 | 60.396 |
| $H_2O$ | 34 | 35.384 |
| Sum of sulphur-containing compounds | 2.036 | 0.093 |

The yield of sulphur-containing compounds in the reactor was equal to:

$$\left(\frac{2.036 - 0.093}{2.036}\right) \times 100 = 95.43\%$$

The yield of the Claus plant+finishing unit was equal to:

$$97+2.86=99.86\%$$

This result shows that, at 125° C., the same temperature as reactor 2 in Example 1, the plant yield was better, losses of sulphur-containing compounds being substantially lower. However, this test was not as good as that of Example 2 operating at a lower temperature.

What is claimed is:

1. In a process for the treatment of a non-hydrocarbon-containing gas containing sulphur-containing gases mainly in the form of hydrogen suilplide and sulphur dioxide, in which the gas (3) is brought into contact at an adequate temperature with an organic solvent (1) containing a catalyst in at least one gas-liquid reactor-contactor (2), and from said reactor-contactor (2) a gaseous effluent (20) substantially no longer containing/hydrogen sulphide and sulphur dioxide is recovered, the improvement wherein a single-phase solution (4) of solvent and sulphur is extracted from the reactor-contactor and a portion is cooled in at least one cooling zone (8) to obtain a suspension of sulphur crystals in the solvent, the crystallised sulphur being separated from the solvent in a separation zone (10), resultant separated sulphur-depleted solvent (1, 14, 15) being recovered and recycled at least in part to the reactor-contactor (2), and the remaining portion of the single-phase solution of solvent and sulphur being recycled to the reactor-contactor (2).

2. A process according to claim 1, in which the separated sulphur crystals contain residual solvent, the separated sulphur crystals are settled and the sulphur crystals are melted in at least one settling zone (12), the residual solvent (17) being recycled at least in part upstream of the cooling zone (8).

3. A process according to claim 1, in which 3% to 50% by weight of the single-phase solution is cooled.

4. A process according to claim 1, in which said remaining portion of the single-phase solution is cooled before recycling it to eliminate at least a portion of the heat of reaction liberated in the reactor-contactor.

5. A process according to claim 1, in which the remaining portion (16) of the sulphur-depleted solvent is recycled upstream of the cooling zone (8).

6. A process according to claim 1, in which the size of the sulphur crystals is increased in at least one crystallisation reservoir (21) before separating them in the separation zone.

7. A process according to claim 2, in which the reactor-contactor (2) has at its lower extremity a heated zone (24) for settling the sulphur, sulphur (23) is introduced into said settling zone and liquid sulphur is collected from the heated zone (24).

8. A process according to claim 1, in which the salts from the catalyst are separated from the single-phase solution of solvent before cooling it, to eliminate said salts.

9. A process according to claim 1, in which the cooling temperature is higher than the solvent solidification temperature.

10. An apparatus for treating a gas containing hydrogen sulphide and sulphur dioxide, comprising at least one gas-liquid reactor-contactor containing at least one packing, at least one gas supply (3), at least one supply (1) for a solvent containing a catalyst, means for evacuating purified gas from the reactor-contactor, means for extracting a portion of a single-phase solution of solvent and sulphur connected to the reactor-contactor, means (8) for cooling solution connected to said extraction means, means (10) for separating sulphur from the solvent solution connected to the cooling means (8), means (14) for recycling solvent connected to the separation means (10) and to the solvent supply (1), means (13) for extracting separated sulphur connected to the separation means, and a line (18) for recycling the remaining portion of the single-phase solution connected to the reactor-contactor.

11. An apparatus according to claim 10, in which at least one crystallisation reservoir (21) is interposed between the cooling means (8) and the separation means (10).

12. An apparatus according to claim 10, in which the separation means (10) comprise a kettle and in which the means for extracting sulphur are connected to the kettle.

13. An apparatus according to claim 10, comprising means for extracting sulphur from the lower portion of the reactor-contractor, said means being connected to a decanting means located in the lower portion of the reactor-contactor, and said means comprising means for evacuating liquid sulphur.

14. An apparatus according to claim 10, in which said means (14) for recycling solvent are also connected to means (4) for extracting the single-phase solution.

15. An apparatus according to claim 10, in which the means for extracting the single-phase solution comprise a means (22) for separating the salts produced in the cooling means (19).

16. An apparatus according to claim 10, in which the recycling line (18) further comprises a heat exchange means (19) for the remaining portion of the single-phase solution.

17. An apparatus according to claim 10, in which said extraction means (4) further comprise a heat exchange means (19) for cooling the single-phase solution.

18. A process according to claim 3, wherein 8–15% by weight of the single-phase solution is cooled.

19. A process according to claim 9, wherein the cooling temperature is in the range of 20° C. to 100° C.

20. A process according to claim 1, wherein tie catalyst is an alkaline salt of salicylic or benzoic acid and the solvent is a mono- or poly- alkylene glycol, a mono- or poly- alkylene glycol ester, or a mono- or poly- alkylene glycol ether.

* * * * *

UNITED STATES PATENT AND TRADEMARK OFFICE
CERTIFICATE OF CORRECTION

PATENT NO.     : 6,413,488 B2
DATED          : July 2, 2002
INVENTOR(S)    : Smith et al.

It is certified that error appears in the above-identified patent and that said Letters Patent is hereby corrected as shown below:

<u>Title page,</u>
Item [75], delete "David" and insert -- Daniel --.

<u>Column 8,</u>
Line 40, delete "suilplic" and insert -- sulphide --.

Signed and Sealed this

Thirty-first Day of December, 2002

JAMES E. ROGAN
*Director of the United States Patent and Trademark Office*